(No Model.)
V. FOUNTAIN.
Oven for Kerosene Stoves.
No. 234,913.  Patented Nov. 30, 1880.
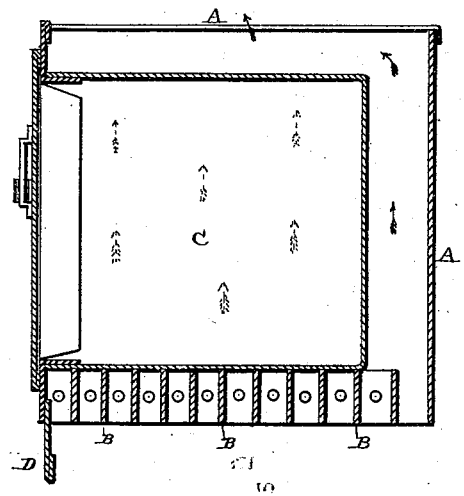
Witnesses
Wm. W. Mortimer
Chas. H. Isham
Inventor.
V. Fountain,
per
F. A. Lehmann,
Atty

UNITED STATES PATENT OFFICE.

VINCENT FOUNTAIN, OF STAPLETON, NEW YORK.

OVEN FOR KEROSENE-STOVES.

SPECIFICATION forming part of Letters Patent No. 234,913, dated November 30, 1880.

Application filed September 23, 1880. (No model.)

*To all whom it may concern:*

Be it known that I, VINCENT FOUNTAIN, of Stapleton, in the county of Richmond and State of New York, have invented certain new and useful Improvements in Ovens for Kerosene-Stoves; and I do hereby declare that the following is a full, clear, and exact description of the invention, such as will enable others skilled in the art to which it pertains to make and use it, reference being had to the accompanying drawing, which forms part of this specification.

My invention relates to an improvement in kerosene-stove ovens; and it consists in an oven which is placed inside of an outer oven or case, the outer oven being bottomless and provided with cross-pieces or supports, upon which the inner oven is supported in position.

It furthermore consists in an apron attached to the lower front edge of the oven so as to extend down any suitable distance and prevent the heat from rising up in front of the oven and burning the operator's hands, as will be more fully described hereinafter.

The object of my invention is not only to prevent the heat from rising up in front of the oven in such a manner as to burn the operator's hands, but to form a support for the inner oven, so that it will not become warped and sink downward out of position so as to be utterly worthless, as is the case where no supports are formed for it.

The accompanying drawing represents a vertical section of my invention.

A represents an outer inclosing case or oven, which is made entirely open at its lower end, where it is applied to the heating device, with the exception of the cross-bars B, which support the inner oven, C. This inner oven is secured to the outer one in any suitable manner, and a sufficient space is left on all sides between the two ovens, with the exception of the front side, to allow the heat to rise up freely around them. The bottom of the oven C is supported upon the top of the cross-bars B, which are placed vertically in the bottom of the outer inclosing-case, so as to obstruct the upward passage of the heat as little as possible. These cross-bars serve to prevent the oven C from becoming warped and dropping down out of position, as it is sure to do in a short time after having become thoroughly heated. By supporting this oven in position by the cross-bars a much greater amount of use can be obtained from the oven than can possibly be done where the oven is left unsupported in the usual manner, and these cross-bars also serve to brace and strengthen the outer oven or frame at the same time.

Secured to the front edge of the outer oven or frame, A, is the apron D, which extends down any suitable distance, and which, by catching over the side of the heating device, forms enough of a joint to prevent the heat from rising up in front of the oven and burning the hands of the operator.

Having thus described my invention, I claim—

1. An oven within an oven, the outer oven being bottomless and provided with a series of cross-bars for supporting the inner oven in position, substantially as shown.

2. A kerosene-stove oven having an apron extending down beyond its front edge, as a means for preventing the heat from rising upward in front of the door, substantially as described.

In testimony that I claim the foregoing I have hereunto set my hand this 18th day of September, 1880.

VINCENT FOUNTAIN.

Witnesses:
 D. S. CORNELL,
 G. CHAMBERS.